Fig. 1.

Sept. 15, 1936.   J. B. FISHER ET AL   2,054,413
STARTING SYSTEM
Filed Dec. 11, 1929   4 Sheets-Sheet 4

Inventors:
James B. Fisher,
Max Hofmann

Patented Sept. 15, 1936

2,054,413

UNITED STATES PATENT OFFICE 2,054,413

STARTING SYSTEM

James B. Fisher and Max Hofmann, Waukesha, Wis., assignors to Waukesha Motor Company, Waukesha, Wis., a corporation of Wisconsin Application December 11, 1929, Serial No. 413,235

20 Claims. (Cl. 123—27)

This invention relates to internal combustion engines, and more particularly to a system for starting and warming an engine up by operating it as an aspiration engine and thereafter operating it as an injection engine.

One of the main objects of our invention is to provide simple and efficient means for supplying a fuel mixture to the engine for operating it as an aspiration engine, in conjunction with means for injecting fuel into the combustion chamber after the engine has been started and warmed up, such means being so related and constructed as to eliminate possibility of an objectionable quantity of the fuel mixture used for starting and warming up the engine being drawn into the combustion chamber and cylinder space when the engine is being operated as an injection engine.

A further object is to provide simple and efficient means whereby the engine can be quickly and safely changed over from aspiration operation to injection operation and vice versa.

Further objects and advantages of our invention will appear from the detailed description.

Figure 3:
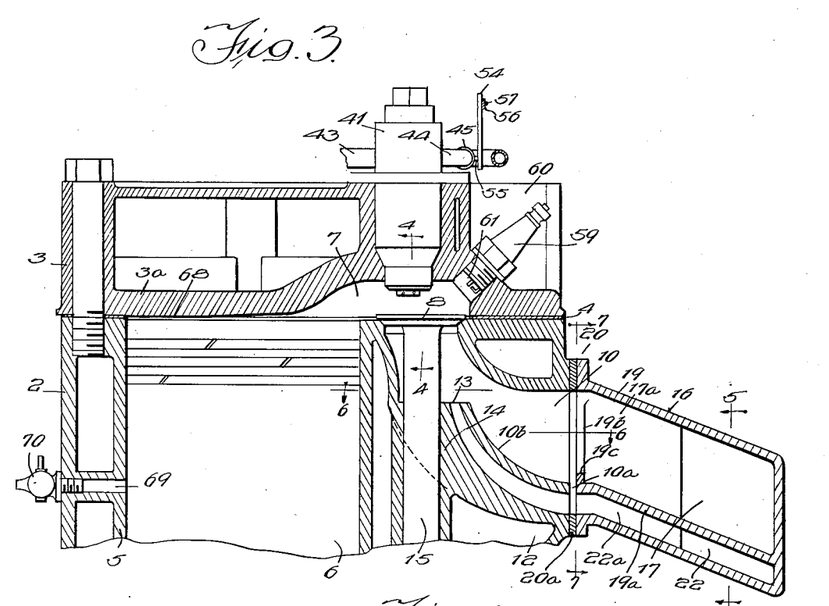
Fig. 3 is a fragmentary vertical sectional view through the head and the upper portion of the cylinder block and the intake manifold of the engine, with a starting system in accordance with our invention applied thereto, taken substantially on line 3—3 of Fig. 2, parts being shown in elevation.

We have illustrated our invention, by way of example, as applied to a four cylinder engine comprising a suitable frame 1, a cylinder block 2 and a head 3 suitably secured on the block in a known manner, a gasket 4 being interposed between the head and the upper end of the block. The cylinders, one of which is shown at 5 in Fig. 3, are suitably supported in the block 2, and a piston 6 reciprocates in each cylinder. The under face of head 3 is flat, or planar, and this head is provided with a combustion chamber 7 which overlies a portion of the cylinder area, this chamber extending to one side of the cylinder and also overlying inlet and exhaust valves 8 and 9, respectively, which control inlet and exhaust passages 10 and 11, respectively, formed in the cylinder block 2. The passage 10 is an air inlet passage, as will be more fully explained hereinafter.

In the four cylinder engine disclosed, the inlet valves 8 are disposed in pairs, the valves of each pair being arranged closely adjacent each other and the passage 10 leading to both of these valves. Block 2 is provided with two upwardly diverging fuel mixture supply passages 12 disposed in close proximity to each other at their lower ends. Each passage 12 curves upwardly and inwardly and opens into passage 10 adjacent the inner end thereof and beneath the valve 8, through a restricted opening 13 disposed adjacent the upper end of guide 14 for stem 15 of valve 8.

The restricted outlet opening 13 is advantageous as increasing the velocity of the gasoline-air mixture so as to thoroughly atomize the same and break up the larger drops of the liquid fuel, which prevents, to a large extent, condensation of the liquid fuel in passage 10.

An intake manifold 16 is suitably secured to the cylinder block 2. This manifold comprises an upper air passage 17 which extends through the body of the manifold, and opens through one end 18 thereof. Arms 19 extend from the manifold and open, at their outer ends, into passage 17. Each of these arms is provided, at its inner end, with a bolting flange 20 which is suitably secured to the block 2, as by cap screws 21. As will be noted more clearly from Fig. 3, the passage 17a of arm 19, which forms a continuation of air passage 17, is in register with the outer end of air inlet passage 10.

Figure 6:
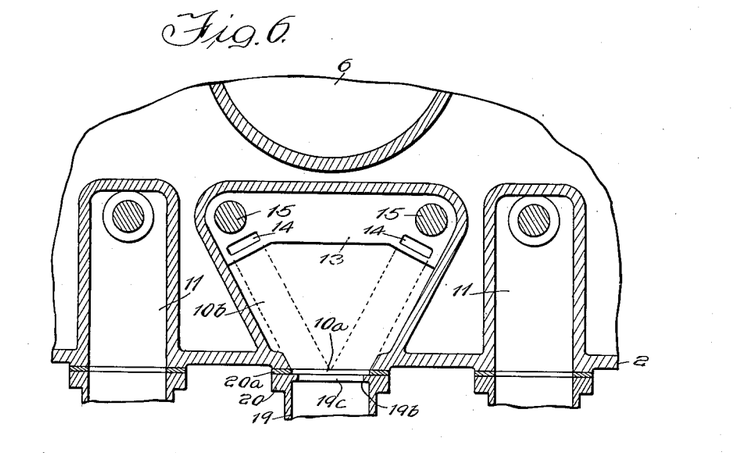
Fig. 6 is a section taken substantially on line 6—6 of Fig. 3.
Figure 7:
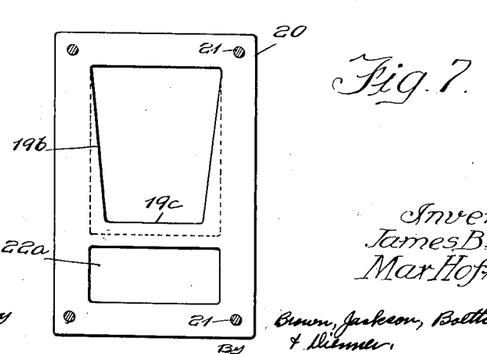
Fig. 7 is a section taken substantially on line 7—7 of Fig. 3.

Referring to Figs. 3, 6 and 7, a gasket 20a of appreciable thickness is disposed between flange 20 and the face of the cylinder block. This gasket conforms to flange 20, thus leaving an opening 10a between lower wall 10b of passage 10, and wall 19a of arm 19 of manifold 16. Wall 10b is inclined downwardly to opening 10a so as to direct any liquid fuel which may be condensed in passage 10 to opening 10a.

This fuel may flow through opening 10a into passage 23, or it may be atomized by air drawn through this opening during the suction stroke, when the engine is operating on the Otto cycle. Arm 19 of the manifold is also provided, at its inner end, with an inwardly projecting web 19b extending along the sides and across the bottom wall of passage 17a. This provides a rib 19c at the outer side of opening 10a, which serves as a dam and assures that no liquid fuel condensed in passage 10 will flow therefrom into passage 17a.

The manifold is also provided with a fuel mixture passage 22 and each of the arms is provided with a lower passage 22a which forms a continuation of passage 22, the inner end of passage 22a being in register with the outer ends of the fuel supply passages 12 of the block. The passages 22 and 22a are small or restricted relative to the air passage 17 of the manifold.

A carburetor 23 is provided for supplying a suitable fuel mixture to passage 22 of the manifold. This carburetor has associated therewith a stack 24 and an air inlet horn 25. The stack 24 is provided at its upper end with a bolting flange 24a by means of which it is bolted or otherwise suitably secured to a seat element 26 of manifold 16, a gasket 27 being interposed between flange 24a and member 26. The stack registers with an opening 28 through the wall of the manifold into the passage 22.

The carburetor and the associated stack and air horn are, in general, of known type and need not be illustrated nor described in detail, it being sufficient to note that suitable means is provided for supplying a suitable mixture of air and a light hydrocarbon, such as gasoline, to passage 22 of the manifold.

Air passage 17 of the manifold opens to the atmosphere through a flanged collar 29, which is suitably secured, as by bolting, to a flange 30 at the open end of the manifold, a gasket 31 being interposed between flange 30 and flange 32 of the collar. A butterfly valve 33 is mounted in collar 29, on a valve rod 34 suitably supported in the collar, diametrically thereof, for turning movement.

An arm 35 is suitably secured upon one end of the valve rod 34 and is connected by an adjustable link 36 to an arm 37, which is secured upon a shaft 38 rockably supported in a suitable manner, as by means of a bracket 39 secured to head 3. A control lever 40 is secured to shaft 38 for turning the same, and by moving this lever in proper direction valve 33 can be adjusted with facility for controlling the flow of air into passage 17 of the intake manifold.

A fuel injection nozzle 41 extends into combustion chamber 7 of each cylinder for injecting fuel into the chamber. This nozzle is suitably mounted in head 3 in a known manner and is, in general, of known construction and operation.

The nozzle 41 is of known type and is operated by the pressure of the fuel to be injected in such manner that the nozzle is opened and a charge of fuel is injected into the combustion chamber at the proper time in the operation of the engine. Fuel under pressure is supplied to each of the nozzles 41, from a suitable fuel pump 42, through a fuel supply tube 43 which connects the nozzle to the pressure discharge side of the pump. A fuel outlet tube 44 is suitably connected to nozzle 41, this tube being provided with a control valve 45 therein of suitable type. Tube 44 returns to a main fuel tank 53. An L 46 provides means for connecting to the tank 47 a return tube 48 which is connected to the return side of the pump for returning to tank 47 the fuel or oil which is not pumped to the nozzle, the pump acting to supply to each nozzle a measured quantity of oil under pressure, as is known in the art.

A supply tube 49 connects tank 47 to the intake side of the pump for supplying oil thereto. The oil in tank 47 may be maintained at a substantially constant level in a known manner. This tank is connected by a tube 50 to a suitable filter 51 which is connected by a tube 52 to main oil supply tank 53.

An arm 54 is suitably secured upon stem 55 of each valve 45.

Figure 5:
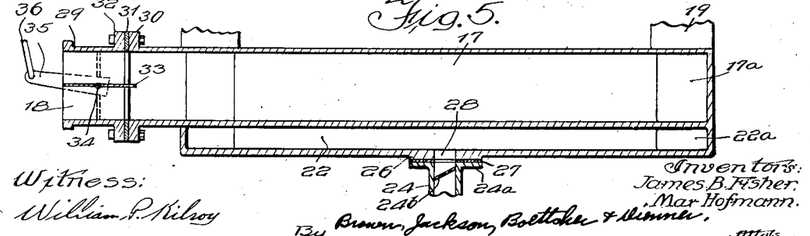
Fig. 5 is a vertical sectional view through the intake manifold and the upper portion of the carburetor stack taken substantially on line 5—5 of Fig. 3, on a reduced scale.

The arm 54 extends upwardly from the valve stem and is connected, at its upper end, to a rod 56 which is pivotally secured to the respective arms in a suitable manner, as at 57. The rearward end of rod 56 is pivotally connected to a second arm 58 suitably secured upon shaft 38. The arms 37 and 58, and associated parts, are so related that, with the control lever 40 in the position of Fig. 2, the air control valve is in the open position of Fig. 5 and the valve 45 of the respective fuel outlet tubes 44 is closed. Under such conditions, the pump 42 being in operation, fuel will be injected from nozzles 41 into the respective combustion chambers 7 and the engine will be operated as an injection engine.

In order that the engine may be operated as an aspiration engine, I provide a spark plug 59, of known type, for igniting the charge in combustion chamber 7 of the respective cylinders. This spark plug is disposed in a pocket 60 formed in the side wall of head 3, and is secured in the head in a known manner, the electrodes of this spark plug being disposed in a small recess or pocket 61 which opens directly into the combustion chamber.

Current is supplied to the spark plug from a magneto 62 in a known manner. This magneto has associated therewith a switch 63 of suitable type which is connected by a rod 64 to one arm of an angle lever 65 rockably mounted in a bracket 66 suitably secured to head 3.

The other arm 67 of this angle lever is pivotally connected to the forward end of rod 56. The parts are so related that with the control lever 40 in the position of Fig. 2, the circuit of magneto 62 is closed, thus rendering the spark plug 59 inoperative. When the lever 40 is moved toward the left, as considered in Fig. 2, into position to close valve 33, the valves 45 of the outlet tubes 44 are opened and switch 63 is operated to open the circuit of the magneto 62, thus rendering the spark ignition means operative. This places the engine in condition to be operated as an aspiration engine.

In order that sufficient compression may be obtained to operate satisfactorily as an injection engine, the combustion chamber 7 should be of the least possible horizontal area consistent with the proper size of valves for controlling the inlet and exhaust, and this chamber should also be of the greatest height possible consistent with the desired compression ratio. The engine illustrated is intended to operate on a compression ratio of from ten or fifteen to one. We find that a compression ratio of twelve and one-half to one is quite satisfactory. The particular relation between the combustion chamber and associated parts is disclosed in the co-pending application of James B. Fisher and Max Hofmann for Injection engine, Serial No. 413,303, filed December 11, 1929, now Patent No. 2,000,225, and need not be considered in detail here.

It is to be noted, however, that the head 3 is provided with a lower wall 3a which overlies the cylinder area beyond that portion of the combustion chamber 7 which also overlies the cylinder area, and that the upper face of the piston 6, when in the position of greatest compression, is disposed closely adjacent the under face of wall 3a and forms therewith a shielded space or area 68, the chamber 7 constituting, at this time, substantially all of the combustion space.

Figure 1:
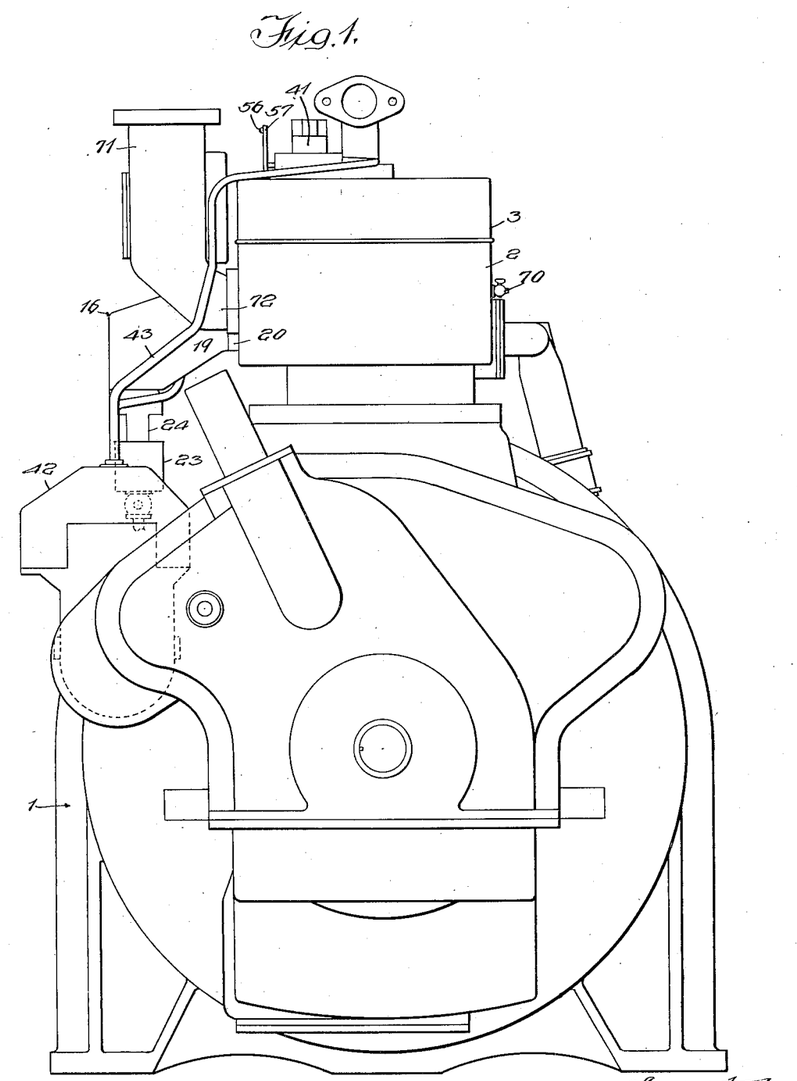
Fig. 1 is a front view of an engine having a starting system in accordance with our invention applied thereto.
Figure 2:
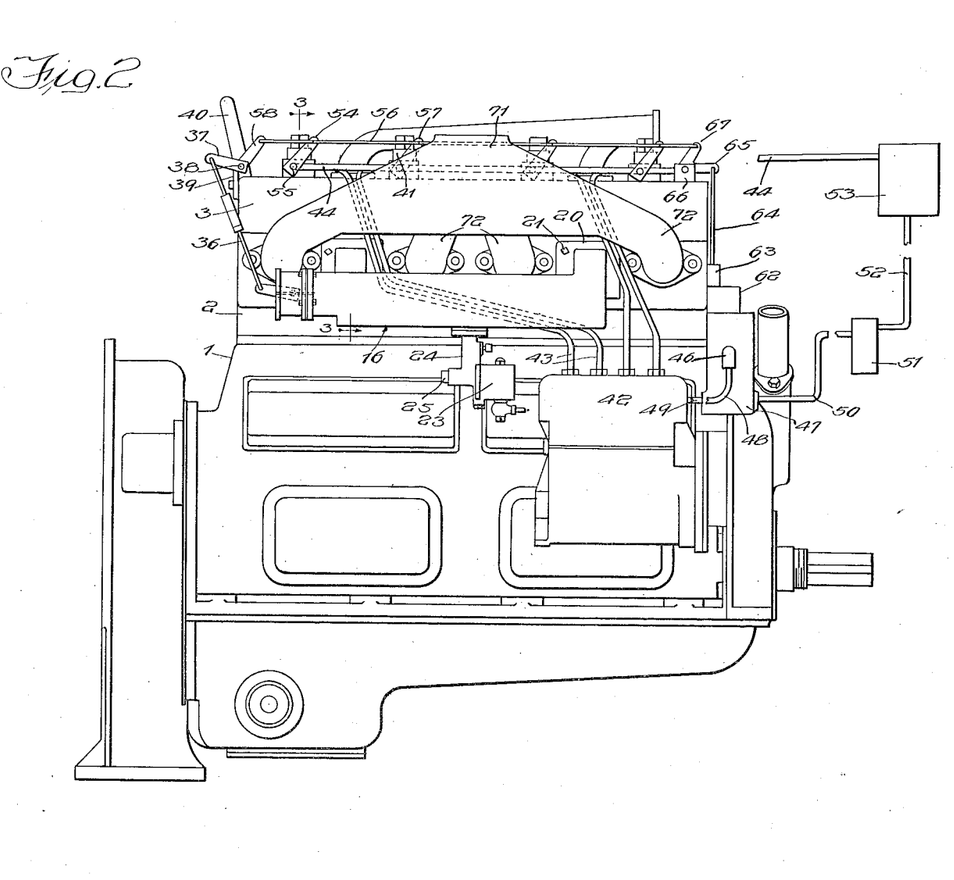
Fig. 2 is an elevation of the engine showing a starting system in accordance with our invention as applied.

For starting the engine, the control lever is moved toward the left, as considered in Fig. 2, into position to close valve 33 and open valves 45 and the circuit of magneto 62. The engine is then cranked over and a mixture of gasoline and air is supplied by the carburetor to the combustion chamber 7, through the restricted passages 22, 22a and 12 and the openings 13. Regulation of this flow may be controlled by a valve 24b. This charge is compressed into the chamber 7 and is ignited by spark plug 59, the engine being then operated on the usual Otto cycle. Due to the fact that the passages for supplying the fuel mixture to the combustion chamber are restricted, as above noted, a full charge of fuel is not supplied to the combustion chamber, and the cylinder, and the compression, when operating on the Otto cycle, is materially reduced relative to the compression when operating the engine on the Diesel cycle.

In order to eliminate the possibility of obtaining a full charge of fuel mixture in the cylinder and combustion chamber when the engine is cranked over slowly, we provide means whereby the volume of air and fuel may be controlled, within limits.

Referring more particularly to Fig. 3, the cylinder block 2 is provided with a sleeve 69 which opens into cylinder 5 at a point which permits compressing only a reduced portion of the charge which has been taken into the cylinder. Preferably, a pet-cock 70 screws into the outer end of sleeve 69 and provides convenient means for regulating, within limits, the volume of fuel and air which is retained within the cylinder and the combustion chamber and is compressed therein.

It is sometimes desirable to place a check valve, (not shown) in petcock 70 to permit air to pass from the cylinder out, but to prevent air from being drawn into the cylinder, which might make the starting mixture too lean.

After the engine has been operated a sufficient length of time on the Otto cycle to bring it up to suitable temperature for Diesel operation, the control lever 40 is moved forwardly or to the right, as considered in Fig. 2, into the position of Fig. 2. This closes valve 45 of the outlet tube 44 from the nozzle 41 and simultaneously opens valve 33 controlling air passage 17 of the intake manifold, while also closing switch 63 of magneto 62 so as to render the spark plug inoperative.

Under such conditions, escape of the oil which is supplied to nozzle 41 under pressure from the pump, through tube 43, is prevented, with the result that pressure is built up in the nozzle 41 and acts to open the valve of this nozzle so as to cause the charge of fuel to be injected into the combustion chamber 7, in a known manner. During the suction stroke of the piston, a charge of air is drawn into the cylinder through passages 10 and 17, and this charge of air is compressed into the combustion chamber 7 during the compression stroke of the piston, the fuel being injected into the air charge when it has been raised to the proper degree of compression and temperature.

The relatively small volume of the combustion chamber 7 is advantageous as creating a higher degree of vacuum in the cylinder space and the combustion chamber, on the suction stroke, than would be possible if a combustion chamber of greater volume were used. This assures an adequate air charge in the cylinder, since a comparatively large volume of air will readily enter during the short interval when the inlet valve 8 is opened. When operating the engine on the Diesel cycle, the pet-cock 70 is closed so as to prevent escape from the cylinder of any of the charging air. As a result, the volume of air and fuel to be compressed in the chamber 7 is materially greater than when operating on the Otto cycle, thus assuring sufficiently high compression to operate satisfactorily on the Diesel cycle.

Due to the fact that the passages for supplying a fuel mixture to the combustion chamber when operating on the Otto cycle are restricted, relative to the passages for supplying the air charge to the cylinder and the combustion chamber when operating on the Diesel cycle, any flow which may occur through the passage 12 and the associated passages, when operating on the Diesel cycle, is negligible and no appreciable quantity of fuel mixture will be drawn into the cylinder with the air charge. The opening of butterfly valve 33 thus has the effect of disabling the means for supplying the fuel mixture to the cylinder and the combustion chamber when the engine is operating on the Otto cycle. When desirable, flow through the carburetor can be completely stopped by closing butterfly valve 24b either manually or automatically by interconnection with the lever 40.

The provision of the separate passages for supplying charging air and a combustible fuel mixture, selectively, to the cylinder, is highly important. If the carburetor communicated directly with air passage 17 of the intake manifold, operation of the engine on the Otto cycle would result in wetting the inner surface of this passage with gasoline and filling the whole space with gasoline air mixture, and when the valve 33 was opened for operating the engine on the Diesel cycle, the air flowing through passages 10 and 17 would carry so heavy a charge of gasoline air mixture into the cylinder that it would be apt to destroy the engine, when ignited.

By providing separate passages for the fuel mixture, this possibility is eliminated, and by having these passages restricted relative to the air passages, it is possible to effectively control the flow of charging air and the fuel mixture, selectively, by suitable operation of valve 33.

The advantage of providing a system which enables the engine to be started and warmed up on the Otto cycle is that it permits the use of an unusually low compression ratio on the Diesel cycle. Preferably, the compression ratio used is so low that it would not assure cold starting of the engine on the Diesel cycle. This low compression reduces bearing pressures and permits the use of a lighter engine for a given output. This starting method has the further advantage of reducing the necessary starting torque and speed, which makes hand starting practical on injection engines as large as any hand started gasoline engines. This small manifold has the further advantage of promoting easy starting because of the relatively high gas velocity through it at low cranking speeds.

Another advantage is the pumping of fuel thru the pressure lines and injectors back to the main fuel tank previous to the operation on the Diesel cycle. This removes all gas from the injection system and so eliminates the possibility of failure from gas pockets, which is a common trouble with injection engines and is well understood by those familiar with the art.

Another advantage of the system is that it permits operating the engine on the Otto cycle with the injectors removed from the cylinders and operating into the atmosphere under normal operating conditions for the purpose of testing and equalizing the fuel sprays and making adjustments on the pump.

While we have illustrated and described our invention as applied to a four cycle engine of the L-head type, by way of example, we do not intend to limit it to L-head types of design or to four cycle engines, since, in its broader aspects, it is capable of being used to advantage with other types of engines and with two cycle engines. In the operation of the engine, in the case of a four cycle engine, the inlet and exhaust valves are operated in synchronism with the engine in a known manner. In Fig. 2 of the drawings, we have indicated the magneto and the switch therefor, as well as the oil tank and associated parts, semi-diagrammatically, for purposes of illustration, and it will be understood that these parts may be arranged in various ways to suit conditions. We have indicated the manifold passages as being contained in a single casting. Operation would be equally satisfactory if the carburetor manifold and air manifold were separate parts.

The block 2 and head 3 are cored out, where feasible, for circulation therethrough of a cooling liquid, in a known manner.

An exhaust manifold 71 is provided for taking off the burned gases. This manifold has arms 72 suitably secured to block 2 and in register with the outer ends of the exhaust passages 11.

Figure 4:
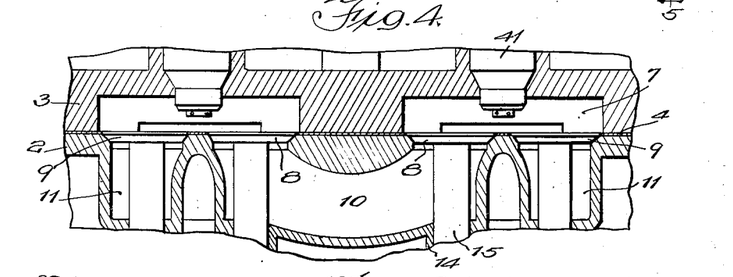
Fig. 4 is a fragmentary section taken substantially on line 4—4 of Fig. 3.
Figure 8:
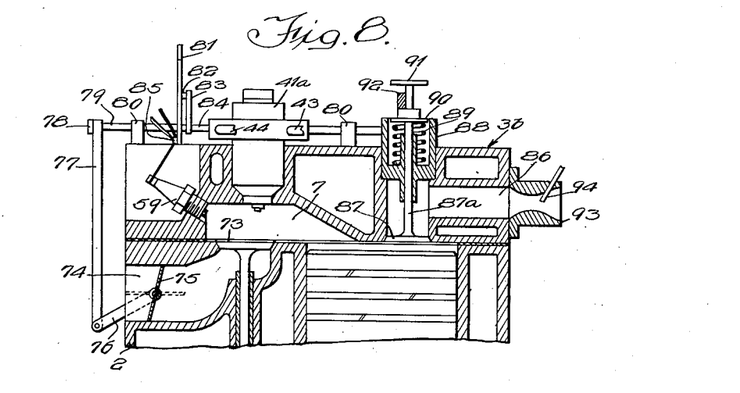
Fig. 8 is a fragmentary vertical sectional view through the engine head and the upper portion of the cylinder block, and associated parts, showing a modified form of our invention.

In Fig. 8 we have shown, semi-diagrammatically, a modified form of our invention. The engine of this figure is provided with inlet and exhaust valves similar to valves 8 and 9 of Fig. 4. Inlet valve 73 controls admission of air, from an air inlet passage 74 in block 2, into combustion chamber 7. A throttle valve 75 is mounted in passage 74 and controls the flow of air therethrough. This valve is connected, by an arm 76, and link 77, to an arm 78 secured on a shaft 79 rockably mounted in brackets 80 suitably secured to head 3b. A control lever 81 is secured on this shaft and is connected, by link 82, to an arm 83 secured on stem 84 of a valve controlling communication between nozzle 41a and outlet tube 44. A switch 85 is interposed in the circuit of spark plug 59 and is suitably connected to lever 81 in such manner as to short circuit the spark plug when the lever is moved into position to open throttle valve 75.

Engine head 3b is provided, at the opposite side thereof from valve 73, with a fuel supply passage 86 the inner end of which overlies the cylinder area. This passage is controlled by a fuel mixture inlet valve 87 which may be operated in any suitable or preferred manner. In the form illustrated, by way of example, the stem 87a of this valve slides through a cage 88, and the valve is urged in closing direction by an expansion coil spring 89 mounted in the cage, about the stem and the guide therefor, and confined between the bottom wall of the cage and an abutment member 90 suitably secured on the valve stem.

A second abutment member 91 is secured on the upper end of valve stem 87a, and coacts with a locking member 92 for holding valve 87 closed. This locking member is suitably connected to shaft 79 to be moved thereby into and out of operative position in accordance with opening and closing of throttle valve 75.

Combustible fuel mixture is supplied to passage 86 in any suitable or preferred manner, as from a carburetor of suitable type. Such a carburetor is indicated, diagrammatically, by a venturi 93, suitably secured to head 3b in register with passage 87, and a fuel nozzle 94 projecting into the venturi. Fuel may be supplied to the nozzle from a suitable source of supply, such as a float chamber, in a manner well known in the art.

With the control lever 81 in the position of Fig. 8, the engine operates as an aspiration engine. At this time, the fuel inlet valve locking member 92 is in its inoperative position illustrated and switch 85 is actuated to render spark plug 59 operative. During the suction stroke of piston 6, valve 87 is opened by atmospheric pressure and a charge of fuel mixture is drawn into the cylinder. This charge is compressed during the compression stroke, at which time valve 87 is closed, and is then ignited by the spark plug 59, and the exhaust valve is opened during the scavenging stroke, which completes the cycle.

When it is desired to operate the engine as an injection engine, lever 81 is moved into position to open valve 75. This movement of the lever serves to also short spark plug 59, rendering it inoperative, as well as to close the valve controlling communication between the nozzle and outlet tube 44, and to move the member 92 into position to lock the valve 87 closed. Under such conditions, the engine is operated as an injection engine in the same manner as in the form illustrated in Figs. 1 to 7. When operating as an injection engine, air is admitted to the cylinder through passage 74, and under ordinary conditions the tension of spring 89 is sufficient to prevent opening of valve 87. The means for positively locking valve 87 closed is not, therefore, essential under all conditions though we prefer to employ such means as a precautionary measure.

What we claim is:—

1. In an internal combustion engine and starting means therefor, a cylinder, a piston reciprocating in the cylinder, a combustion chamber communicating with the cylinder, an inlet passage opening into the combustion chamber, an inlet valve controlling communication between said passage and the combustion chamber, a fuel mixture supply passage opening into the inlet passage adjacent and outwardly beyond the inlet valve, a manifold having an air passage communicating with said inlet passage, said manifold also having a second passage communicating with the fuel supply passage, a carburetor communicating with the second passage of the manifold, a valve controlling said air passage, means for injecting fuel into the combustion chamber, means for operating the air passage valve and for rendering the injecting means operative and inoperative in accordance with opening and closing of said air passage valve, and spark means for igniting the charge in the combustion chamber.

2. In an internal combustion engine and starting means therefor, a cylinder, a piston reciprocating in the cylinder, a combustion chamber communicating with the cylinder, an air inlet passage opening into the combustion chamber, a relatively restricted fuel mixture supply passage opening into the inlet passage adjacent the inner end thereof, an inlet valve controlling communication between the inlet passage and the combustion chamber, a valve for controlling said inlet passage, means for injecting fuel into the combustion chamber, means for supplying a fuel mixture to said supply passage, means for operating the inlet passage control valve and for rendering the injecting means operative and inoperative in accordance with opening and closing of said inlet passage control valve, and spark means for igniting the charge in the combustion chamber.

3. In an internal combustion engine and starting means therefor, a cylinder, a piston reciprocating in the cylinder, a combustion chamber communicating with the cylinder, an air inlet passage opening into the combustion chamber, a relatively restricted fuel mixture supply passage opening into the inlet passage adjacent the inner end thereof, an inlet valve controlling communication between the inlet passage and the combustion chamber, a valve adjacent the outer end of and controlling the inlet passage, a carburetor communicating with the fuel mixture supply passage, an injecting nozzle for injecting fuel into the combustion chamber, a fuel supply tube communicating with the nozzle, a fuel outlet tube communicating with the nozzle, a valve controlling the outlet tube, spark means for igniting the charge in the combustion chamber, and control means for simultaneously opening the inlet passage control valve and closing the valve in the outlet tube and vice versa.

4. In an internal combustion engine and starting means therefor, a cylinder, a piston reciprocating in the cylinder, a combustion chamber communicating with the cylinder, an air inlet passage opening into the combustion chamber, a relatively restricted fuel mixture supply passage opening into the inlet passage adjacent the inner end thereof, an inlet valve controlling communication between the inlet passage and the combustion chamber, a valve adjacent the outer end of and controlling the inlet passage, a carburetor communicating with the fuel mixture supply passage, an injecting nozzle for injecting fuel into the combustion chamber, a fuel supply tube communicating with the nozzle, a fuel outlet tube communicating with the nozzle, a valve controlling the outlet tube, spark means for igniting the charge in the combustion chamber, and control means for simultaneously opening the inlet passage control valve and closing the valve in the outlet tube and vice versa, said control means also rendering the spark means inoperative and operative in accordance with opening and closing of the air inlet passage control valve.

5. In an internal combustion engine and starting means therefor, a cylinder, a piston reciprocating in the cylinder, a combustion chamber communicating with the cylinder, an air inlet passage opening into the combustion chamber, a relatively restricted fuel mixture supply passage opening into the inlet passage adjacent the inner end thereof, an inlet valve controlling communication between the inlet passage and the combustion chamber, a manifold having an air passage communicating with the inlet passage and a relatively restricted passage communicating with the fuel mixture supply passage, a carburetor communicating with the restricted passage of the manifold, a valve controlling the manifold air passage, an injecting nozzle for injecting fuel into the combustion chamber, a fuel supply tube communicating with the nozzle, an outlet tube leading from the nozzle, a valve controlling said outlet tube, spark means for igniting the charge in the combustion chamber, a control member, and operating connections between said member and the valve of the manifold air passage and the valve of the outlet tube for simultaneously operating said valves in opposite relation.

6. In an internal combustion engine and starting means therefor, a cylinder, a piston reciprocating in the cylinder, a combustion chamber communicating with the cylinder, an air inlet passage opening into the combustion chamber, a relatively restricted fuel mixture supply passage opening into the inlet passage adjacent the inner end thereof, an inlet valve controlling communication between the inlet passage and the combustion chamber, a manifold having an air passage communicating with the inlet passage and a relatively restricted passage communicating with the fuel mixture supply passage, a carburetor communicating with the restricted passage of the manifold, a valve controlling the manifold air passage, an injecting nozzle for injecting fuel into the combustion chamber, a fuel supply tube communicating with the nozzle, an outlet tube leading from the nozzle, a valve controlling said outlet tube, spark means for igniting the charge in the combustion chamber, a control member, and means for simultaneously operating the valve in the outlet tube and the valve of the manifold air passage in opposite relation and for rendering said spark means operative and inoperative in accordance with closing and opening of said manifold air passage valve.

7. In an internal combustion engine and starting means therefor, a cylinder, a piston reciprocating in the cylinder, a combustion chamber communicating with the cylinder, an air inlet passage opening into the combustion chamber, a relatively restricted fuel mixture supply passage opening into the inlet passage adjacent the inner end thereof, an inlet valve controlling communication between the inlet passage and the combustion chamber, a valve disposed outwardly of the inner end of the fuel supply passage and controlling said air inlet passage, means for injecting fuel into the combustion chamber, spark means for igniting the fuel charge in the combustion chamber, and means for disabling the injecting means and the spark means, selectively.

8. In an internal combustion engine and starting means therefor, a cylinder, a piston reciprocating in the cylinder, a combustion chamber communicating with the cylinder, an air inlet passage communicating with the cylinder and the combustion chamber, a relatively restricted fuel mixture supply passage opening into the inlet passage adjacent the inner end thereof, the air inlet passage having an air intake opening of considerably greater area than the opening of the fuel mixture passage into the air inlet passage, means for controlling admission of air to said inlet passage, means for injecting fuel into the combustion chamber, spark means for igniting the fuel charge in the combustion chamber, and means for disabling the injecting means and the spark means, selectively.

9. In an internal combustion engine and starting means therefor, a cylinder, a piston reciprocating in the cylinder, a combustion chamber communicating with the cylinder, an air inlet passage communicating with the cylinder and the combustion chamber, a fuel mixture supply passage also communicating with the cylinder and the combustion chamber, said supply passage being restricted relative to the air inlet passage, means for controlling admission of air to the inlet passage, means for injecting fuel into the combustion chamber, spark means for igniting the fuel charge in the combustion chamber, and means for disabling the injecting means and the spark means, selectively.

10. In an internal combustion engine and starting means therefor, a cylinder, a piston reciprocating in the cylinder, a combustion chamber communicating with the cylinder, an air inlet passage communicating with the cylinder and the combustion chamber, a fuel mixture supply passage opening into the air passage adjacent the inner end thereof, the lower wall of the air passage being inclined downwardly toward its outer end and having an opening into the fuel supply passage, means for supplying a fuel mixture to said supply passage, means for controlling admission of air to the inlet passage, means for injecting fuel into the combustion chamber, spark means for igniting the fuel mixture charge in the combustion chamber, and means for disabling the injecting means and the spark means, selectively.

11. In an internal combustion engine and starting means therefor, a cylinder, a piston reciprocating in the cylinder, a combustion chamber communicating with the cylinder, an air inlet passage communicating with the cylinder and the combustion chamber, a fuel mixture supply passage opening into the air passage adjacent the inner end thereof, the lower wall of the air passage being inclined downwardly toward its outer end and having an opening into the fuel supply passage, a member extending across the air inlet passage adjacent the outer edge of the opening therefrom into the fuel supply passage and disposed to prevent flow of condensed liquid fuel beyond such opening into said inlet passage, means for supplying a fuel mixture to said supply passage, means for controlling admission of air to the inlet passage, means for injecting fuel into the combustion chamber, spark means for igniting the fuel mixture charge in the combustion chamber, and means for disabling the injecting means and the spark means, selectively.

12. In an L-head internal combustion engine and starting means therefor, a cylinder, a piston reciprocating in the cylinder, a combustion chamber communicating with the cylinder at one side thereof, an air inlet passage communicating with said chamber, a valve controlling said passage, a fuel mixture inlet passage communicating with the chamber, valve means controlling said fuel mixture inlet passage, said chamber overlying the passages and the valve therefor, spark means for igniting the fuel mixture charge in the chamber, means for injecting fuel into the combustion chamber, and means for disabling the spark means and the injecting means, selectively.

13. In an L-head internal combustion engine and starting means therefor, a cylinder, a piston reciprocating in the cylinder, an air and fuel mixture inlet passage, a burnt gas outlet passage, valves controlling said passages, said passages and the valves therefor being disposed to one side of the cylinder, a combustion chamber overlying the valves and passages and opening into the cylinder, spark means for igniting the fuel mixture charge in the combustion chamber, means for injecting fuel into the combustion chamber, and means for disabling the spark means and the injecting means, selectively.

14. In an L-head internal combustion engine and starting means therefor, a cylinder, a piston reciprocating in the cylinder, an air and fuel mixture inlet passage, a carburetor connected to said passage, a burnt gas outlet passage, valves controlling said passages, a combustion chamber, spark means for igniting the fuel mixture charge in the combustion chamber, means for injecting fuel into the combustion chamber, means for disabling the spark means and the injecting means, selectively, the operation of the valves remaining unaltered when the injecting means is put into operation and the spark means is disabled, an air conduit separate from the carburetor and communicating with said passage, and means for optionally rendering said conduit operative and inoperative for flow of air therethrough.

15. In an internal combustion engine and starting means therefor, a cylinder, a piston reciprocating in the cylinder, a combustion chamber communicating with the cylinder, means for injecting fuel into the combustion chamber, means including inlet and exhaust passages and control valves therefor for supplying air and fuel mixture to the combustion chamber and for exhausting burnt gases from said chamber, spark means for igniting the charge in the combustion chamber, means for disabling the injecting means and rendering the fuel mixture supply means operative, and vice versa, without altering the operation of said valves, and supplemental means independent of the fuel mixture supply means for admitting air to the combustion chamber when the injecting means is operative, said supplemental means being inoperative for admitting air when the injecting means is disabled.

16. An intake system for solid injection engines equipped with volatile mixture starting means comprising, in combination with an engine, a duplex manifold having a conduit for air and a conduit for volatile mixture, said conduits discharging in substantially horizontal directions with the volatile mixture conduit under the air conduit whereby liquid from the volatile mixture conduit does not run on to the walls of the air conduit.

17. An intake system for solid injection engines equipped with volatile mixture starting means comprising, in combination with an engine, a duplex manifold having a conduit for air and a conduit for volatile mixture, said conduits discharging in substantially horizontal directions with the volatile mixture conduit under the air conduit and formed with a flattened discharge end.

18. A gaseous fluid supply system for engines equipped with liquid fuel injection means and with means for starting on a volatile mixture cycle comprising in combination with an engine block having an inlet port, air supply means communicating with said port, independent volatile mixture supply means communicating with said port, and liquid draining means formed to direct condensed liquid into the volatile mixture supply means.

19. A gaseous fluid supply system for engines equipped with liquid fuel injection means and with means for starting on a volatile mixture cycle comprising in combination with an engine block having an inlet port, an air supply conduit having an outlet end terminating adjacent said port, and an independent volatile mixture supply conduit having an outlet end terminating adjacent said port, said volatile mixture outlet end being provided with an inclined lower surface to receive liquid draining from the inlet port.

20. A gaseous fluid supply system for engines equipped with liquid fuel injection means and with means for starting on a volatile mixture cycle comprising in combination with an engine block having an inlet port, an air supply conduit having an outlet end terminating adjacent said port, an independent volatile mixture conduit having an outlet end terminating adjacent said port, and means cooperating with said outlet ends formed to deflect any flow of condensed liquid from the volatile mixture conduit away from the air supply conduit.

JAMES B. FISHER.
MAX HOFMANN.